(12) United States Patent
Ji et al.

(10) Patent No.: US 11,988,317 B2
(45) Date of Patent: May 21, 2024

(54) ADAPTIVE SEALING DEVICES FOR PIPELINE POROUS LEAKAGE

(71) Applicant: CHANGZHOU UNIVERSITY, Jiangsu (CN)

(72) Inventors: Hong Ji, Changzhou (CN); Jie Guo, Changzhou (CN); Ke Yang, Changzhou (CN); Juncheng Jiang, Changzhou (CN); Zhixiang Xing, Changzhou (CN); Kai Zheng, Changzhou (CN)

(73) Assignee: CHANGZHOU UNIVERSITY, Changzhou (CN)

( * ) Notice: Subject to any disclaimer, the term of this patent is extended or adjusted under 35 U.S.C. 154(b) by 0 days.

(21) Appl. No.: 18/173,751

(22) Filed: Feb. 23, 2023

(65) Prior Publication Data
US 2023/0366502 A1    Nov. 16, 2023

Related U.S. Application Data

(63) Continuation-in-part of application No. PCT/CN2022/124256, filed on Oct. 10, 2022.

(30) Foreign Application Priority Data

May 14, 2022 (CN) .......................... 202210524190.1
Jun. 8, 2022 (CN) .......................... 202210639760.1

(51) Int. Cl.
*F16L 55/17* (2006.01)

(52) U.S. Cl.
CPC .................................... *F16L 55/17* (2013.01)

(58) Field of Classification Search
CPC ....... F16L 55/17; F16L 55/1705; Y02E 10/20; F17D 5/00
See application file for complete search history.

(56) References Cited

U.S. PATENT DOCUMENTS 5,052,092 A  *  10/1991  Vallauri ................... H02G 1/14
                                                              29/745
2004/0011415 A1    1/2004  Kakoschke et al.
(Continued)

FOREIGN PATENT DOCUMENTS

CN    107740906 A    2/2018
CN    209012643 U    6/2019
(Continued)

OTHER PUBLICATIONS

Notification to Grant Patent Right for Invention in Chinese Application No. 202210639760.1 dated Sep. 28, 2023, 4 pages.

*Primary Examiner* — James M Hewitt, II
(74) *Attorney, Agent, or Firm* — METIS IP LLC

(57) ABSTRACT

An adaptive sealing device for pipeline porous leakage. The device includes a pressure protection device and an encircling sealing rubber cover. The pressure protection device is used to pressurize and seal the pipeline by the encircling sealing rubber cover. The device further includes a control mechanism connected with the pressure protection device for adjusting the sealing pressure of the pressure protection device on the pipeline. The device further includes an anti-retraction mechanism connected with the pressure protection device and the control mechanism for limiting the pressure protection device and/or the control mechanism.

7 Claims, 8 Drawing Sheets

(56) References Cited

U.S. PATENT DOCUMENTS

| | | | | |
|---|---|---|---|---|
| 2005/0103948 | A1* | 5/2005 | Vu | ............... F16L 55/17 248/65 |
| 2010/0313625 | A1 | 12/2010 | Green | |

FOREIGN PATENT DOCUMENTS

| | | | | |
|---|---|---|---|---|
| CN | 209587476 | U | | 11/2019 |
| CN | 210240911 | U | | 4/2020 |
| CN | 111828772 | A | | 10/2020 |
| CN | 112594460 | | | 4/2021 |
| CN | 112607523 | A | | 4/2021 |
| CN | 213332780 | | | 6/2021 |
| CN | 213685590 | U | | 7/2021 |
| CN | 214037351 | U | | 8/2021 |
| CN | 214119357 | | | 9/2021 |
| CN | 113685650 | | | 11/2021 |
| CN | 215862925 | U | | 2/2022 |
| CN | 216280072 | U | * | 4/2022 |
| CN | 114909541 | | | 8/2022 |
| KR | 100692102 | B1 | | 3/2007 |
| WO | 2012053892 | A2 | | 4/2012 |

* cited by examiner

600

```
┌─────────────────────────────────────────────────┐
│ Determining the distribution vector of the sealing │  610
│ effect of at least one candidate inflation pressure by │
│ a preset method based on the pressure detection │
│ value and in combination with the mechanical │
│ property of material of the pipeline and the feature of │
│ the leakage hole │
└─────────────────────────────────────────────────┘
                        │
                        ▼
┌─────────────────────────────────────────────────┐
│ Determining, based on the distribution vector of the │  620
│ sealing effect, the optimal inflation pressure of the │
│ numerical control pressure device │
└─────────────────────────────────────────────────┘
```

FIG. 6

ADAPTIVE SEALING DEVICES FOR PIPELINE POROUS LEAKAGE

CROSS-REFERENCE TO RELATED APPLICATIONS

This application is a continuation-in-part application of International Application No. PCT/CN2022/124256, filed on Oct. 10, 2022, which claims priority to Chinese Patent Application No. 202210639760.1, filed on Jun. 8, 2022, which claims priority to Chinese Patent Application No. 202210524190.1, filed on May 14, 2022, the contents of which are hereby incorporated by reference to their entireties. This application also directly claims priority to Chinese Patent Application No. 202210524190.1, filed on May 14, 2022, the contents of which are hereby incorporated by reference to its entirety.

TECHNICAL FIELD

The present disclosure relates to the technical field of pipeline sealing device, and in particular to an adaptive sealing device for pipeline porous leakage.

BACKGROUND

Pipeline transportation is generally used for long-distance transportation of gas, liquid, or other media. It is widely used in various social production activities because of its advantages such as fast transportation speed, long transportation distance, large transportation volume, etc. However, the pipeline may break during use, leading to the leakage of the transported medium. Due to the different pore sizes of the pipeline leakage holes, it is difficult to judge the pressure at the leakage holes, so that the pipeline may not be plugged well, affecting the plugging efficiency and quality, and even affecting the surrounding environment and social production to a certain extent.

Therefore, it is hoped to provide an adaptive sealing device for pipeline porous leakage to solve the above problems.

SUMMARY

One or more embodiments of the present disclosure provide an adaptive sealing device for pipeline porous leakage. The sealing device includes: a pressure protection device and an encircling sealing rubber cover, and the pressure protection device is used to pressurize and seal the pipeline based on the encircling sealing rubber cover. The sealing device further includes a control mechanism connected with the pressure protection device for adjusting the sealing pressure of the pressure protection device on the pipeline. The sealing device further includes an anti-retraction mechanism connected with the pressure protection device and the control mechanism for limiting the pressure protection device or the control mechanism.

In some embodiments, a number of the pressure protection devices is multiple, multiple pressure protection devices are arranged around the pipeline, the pressure protection device includes an external fixing seat and a pressure plate, and the external fixing seats of the two adjacent pressure protection devices are interconnected with to form an external fixing device. The control mechanism is used to control the pressure plate to approach or move away from the pipeline, the control mechanism includes a transverse shaft rod, at least two opposite sliding holes are provided on the external fixing seat, a pressure piston that is matched with the sliding hole is provided in the sliding hole, a rod cavity protruding from the sliding hole is formed between one end of the pressure piston and the sliding hole and is movably connected with one end of the transverse shaft rod, other end of the pressure piston is a rodless cavity, the external fixing seat is provided with a through hole connected with the rodless cavity, and other end of the transverse shaft rod is movably connected with the pressure plate. The anti-retraction mechanism is used to stop the pressure piston and is arranged between the transverse shaft rod and the external fixing seat. The encircling sealing rubber cover is arranged between the pressure plate and the pipeline, and the pressure plate is arranged between the external fixing device and the encircling sealing rubber cover.

In some embodiments, the external fixing seat is provided with a limited slideway, the limited slideway is arranged along a displacement direction of the transverse shaft rod, and an end of the pressure piston protruding out of the slide hole is matched with the limited slideway and is slidably arranged in the limited slideway.

In some embodiments, the anti-retraction mechanism includes a one-way pawl, the one-way pawl is arranged on the transverse shaft rod, the external fixing seat is provided with a one-way tooth groove along a displacement direction of the transverse shaft rod, and the one-way tooth groove is matched with the one-way pawl.

In some embodiments, an elastic element is arranged between the one-way pawl and the transverse shaft rod.

In some embodiments, the encircling sealing rubber cover is provided with a strain gauge pressure sensor and a numerical control pressure device, the strain gauge pressure sensor is signal connected with the numerical control pressure device, and an output end of the numerical control pressure device is connected with the through hole for inflating and pressurizing the through hole.

In some embodiments, the numerical control pressure device is further used for: in response to that the pressure detection value of the strain gauge pressure sensor exceeds the device sealing level, pressurizing inlet air of the through hole, the device sealing level being determined based on a tooth amount of the one-way pawl.

In some embodiments, determining an inflation pressure of the through hole by the numerical control pressure device includes: determining a distribution vector of sealing effect of at least one candidate inflation pressure by a preset method based on the pressure detection value and in combination with mechanical property of material of the pipeline and a feature of a leakage hole; and determining an optimal inflation pressure of the numerical control pressure device based on the distribution vector of the sealing effect.

In some embodiments, determining the distribution vector of the sealing effect of at least one candidate inflation pressure by a preset method based on the pressure detection value and in combination with mechanical property of material of the pipeline and a feature of a leakage hole includes: determining the distribution vector of the sealing effect of the at least one candidate inflation pressure by processing the pressure detection value, the feature of the leakage hole, the mechanical property of material of the pipeline, and the at least one candidate inflation pressure through a sealing judgment model, the sealing judgment model being a machine learning model.

In some embodiments, the sealing judgment model includes a pipeline feature embedded layer, a demand feature embedded layer, and an output pressure judgment layer. The pipeline feature embedded layer, the demand feature embedded layer, and the output pressure judgment layer are machine learning models. The determining a distribution vector of sealing effect of at least one candidate inflation pressure by a preset method based on the pressure detection value and in combination with mechanical property of material of the pipeline and a feature of a leakage hole further includes: determining, based on the mechanical property of the material of the pipeline and the feature of leakage hole, a pipeline feature vector through the pipeline feature embedded layer; determining, based on the pressure detection value and a transportation medium state, a demand feature vector through the demand feature embedded layer; determining, based on the pipeline feature vector, the demand feature vector, and the at least one candidate inflation pressure, the distribution vector of the sealing effect of at least one candidate inflation pressure through the output pressure judgment layer.

In some embodiments, at least one candidate inflation pressure is obtained by retrieving based on vector database, including: determining the pipeline feature vector based on the feature of the leakage hole and the mechanical property of material of the pipeline; determining the demand feature vector based on the pressure detection value and the transportation medium state; determining, based on the pipeline feature vector, at least one first reference history vector of the pipeline feature vector in the first vector database, the first reference history vector being a historical pipeline feature vector in the first vector database that meets the preset relationship with the pipeline feature vector; determining, based on the demand feature vector, at least one second reference history vector of the demand feature vector in the second vector database, the second reference history vector being the historical demand feature vector in the second vector database that meets a preset relationship with the demand feature vector; and determining at least one candidate inflation pressure based on a first historical inflation pressure corresponding to at least one of the first reference history vector and the second historical inflation pressure corresponding to at least one second reference history vector.

In some embodiments, the pipeline feature vector is obtained based on the pipeline feature embedded layer of the sealing judgment model, and the demand feature vector is obtained based on the demand feature embedded layer of the sealing judgment model.

In some embodiments, determining at least one candidate inflation pressure based on a the first historical inflation pressure corresponding to at least one of the first reference history vector and the second historical inflation pressure corresponding to at least one second reference history vector includes: determining the candidate inflation pressure based on the weight sum of the first historical inflation pressure and the second historical inflation pressure, the weight values of the first historical inflation pressure and the second historical inflation pressure being related to the mechanical property of material of the pipeline.

In some embodiments, the determining an optimal inflation pressure of the numerical control pressure device based on the distribution vector of the sealing effect includes: determining, based on the candidate inflation pressure, the distribution vector of the sealing effect corresponding to the candidate inflation pressure through the sealing judgment model; in response to that the distribution vector of the sealing effect corresponding to the candidate inflation pressure does not meet a preset condition, adjusting the candidate inflation pressure based on a preset adjustment rule until the distribution vector of the sealing effect corresponding to the candidate inflation pressure meets the preset condition; and determining the optimal inflation pressure based on the candidate inflation pressure and the distribution vector of the sealing effect corresponding to the candidate inflation pressure.

In some embodiments, the sealing device for pipeline porous leakage also includes a pressure preloading mechanism for pressurizing and preloading the pressure plate, and the pressure preloading mechanism is arranged between the external fixing seat and the pressure plate and is located between two relatively moving transverse shaft rod.

In some embodiments, the pressure preloading mechanism includes a pressure rod, one end of the pressure rod is connected with the external fixing seat, and the other end of the pressure rod is abutted on the pressure plate.

In some embodiments, the pressure plate is provided with a limited hole, the limited hole is matched with the pressure rod, and the other end of the pressure rod is butted in the limit hole.

In some embodiments, the encircling sealing rubber cover includes a plurality of sealing rubber blocks, and the plurality of sealing rubber blocks are connected head to tail to form an encircling sealing rubber cover.

In some embodiments, two adjacent sealing rubber blocks are connected by a clamping groove and a clamping block.

BRIEF DESCRIPTION OF THE DRAWINGS

The present disclosure will further explain in the form of exemplary embodiments, which will be described in detail by the attached drawings. These examples are non-limiting, and in these examples, the same number indicates the same structure, wherein:

FIG. 6 is an exemplary flowchart illustrating a process of determining inflation pressure according to some embodiments of the present disclosure;

DETAILED DESCRIPTION

Figure 1:
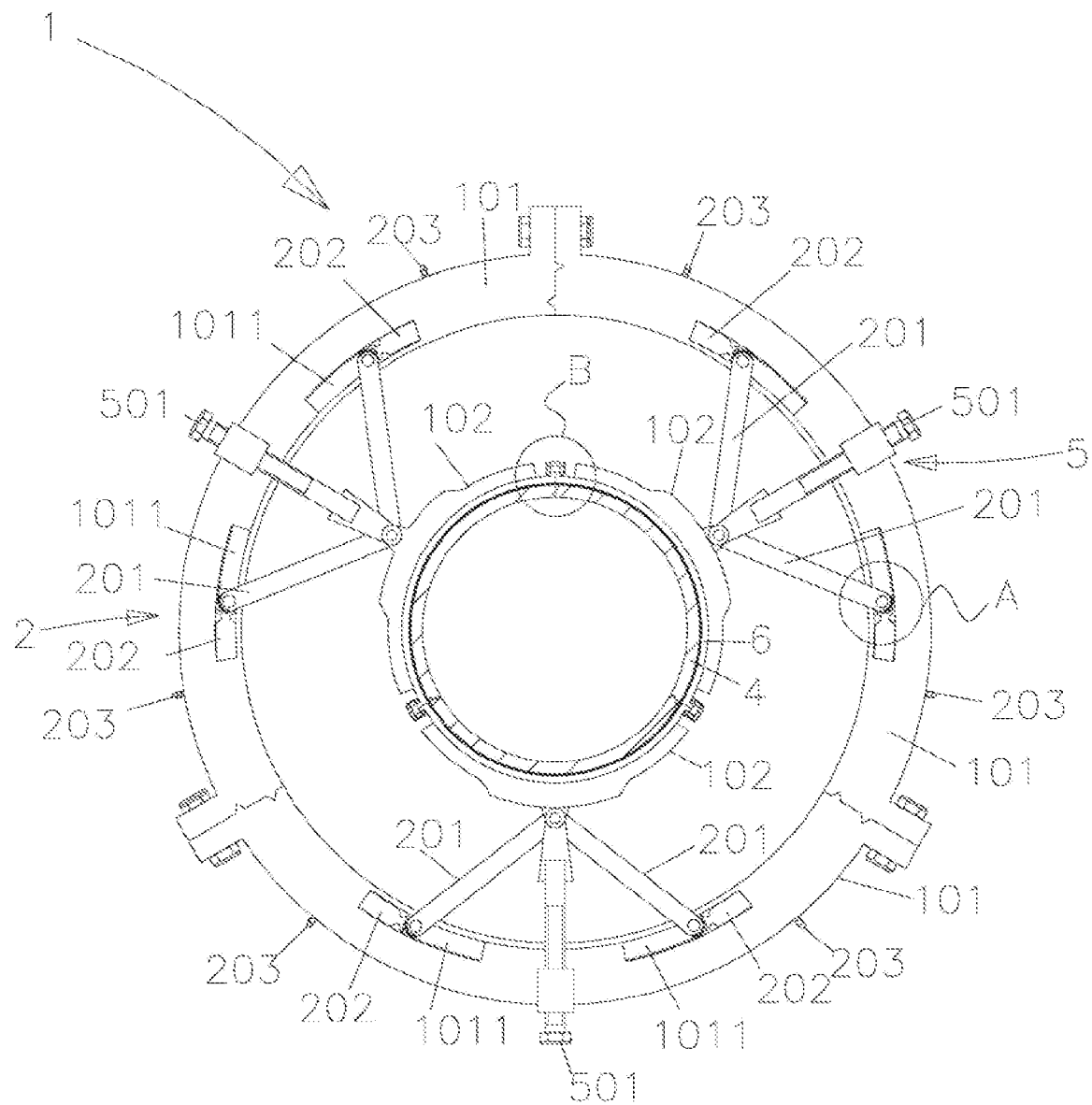
FIG. 1 is a structural schematic diagram of an adaptive sealing device for pipeline porous leakage according to some embodiments of the present disclosure.

In order to more clearly explain the technical solution of the embodiments of the present disclosure, the following will briefly introduce the drawings needed in the description of the embodiments. Obviously, the drawings in the following description are just some examples or embodiments of this specification. For ordinary technicians in the art, the present disclosure may also be applied to other similar scenarios according to these drawings without any creative effort. Unless obviously obtained from the context or the context illustrates otherwise, the same numeral in the drawings refers to the same structure or operation It should be understood that "system", "device", "unit" and/or "module" as used herein is a method for distinguishing different components, elements, parts, sections or assemblies of different levels. However, the words may be replaced by other expressions if other words may achieve the same purpose.

As indicated in the specification and claims, the terms "a", "an" and/or "the" are not specific to the singular and may include the plural unless the context clearly indicates an exception. Generally speaking, the terms "comprising" and "including" only suggest the inclusion of clearly identified steps and elements, and these steps and elements do not constitute an exclusive list, and the method or device may also contain other steps or elements.

The flowchart is used in this disclosure to illustrate the operations performed by the system according to the embodiment of the present disclosure. It should be understood that the preceding or following operations are not necessarily performed in the exact order. Instead, various steps may be processed in reverse order or simultaneously. At the same time, other operations may be added to these procedures, or a certain step or steps may be removed from these procedures.

FIG. 1 is a schematic structural diagram of an adaptive sealing device for pipeline porous leakage according to some embodiments of the present disclosure.

As shown in FIG. 1, the embodiment of the present disclosure provides an adaptive sealing device for pipeline porous leakage. The sealing device may include a pressure protection device 1, a control mechanism 2, an anti-retraction mechanism 3, and an encircling sealing rubber cover 4.

The pressure protection device 1 may refer to a device for pressurizing and sealing the pipeline based on the encircling sealing rubber cover 4.

In some embodiments, the number of pressure protection device 1 may be multiple, and multiple pressure protection devices 1 are arranged around the pipeline to realize pressure and sealing of the pipeline. It should be noted that the number of pressure protection device 1 may be determined based on actual needs.

In some embodiments, the pressure protection device 1 may include an external fixing seat 101 and a pressure plate 102.

The external fixing seat 101 may refer to a component arranged on the external layer of the sealing device for fixing other components. In some embodiments, the number of external fixing seat 101 is consistent with the number of pressure protection device 1, and the external fixation seats 101 of two adjacent pressure protection devices 1 are interconnected to form an external fixing device. The external fixing device may refer to a device formed by connecting and combining a plurality of external fixing seats 101. For more information about the external fixing seat 101, please refer to the relevant descriptions in FIGS. 1, 2, and 5.

In some embodiments, "interconnection" may include, but is not limited to, detachable connection. For example, the adjacent two pressure protection devices 1 may be detachably connected through bayonet connection, threaded fitting, etc., and may be easily opened and closed between the adjacent two pressure protection devices 1 through detachable connection. In some embodiments, the detachable connection may also be in other ways.

The pressure plate 102 may refer to a member for applying pressure to a pipeline. In some embodiments, the number of pressure plate 102 is also consistent with the number of pressure protection device 1, and multiple pressure plates 102 are also arranged around the pipeline. For more details about the pressure plate 102, refer to the relevant descriptions in FIGS. 1, 2, and 5.

The control mechanism 2 may refer to a mechanism connected to the pressure protection device 1 for adjusting the sealing pressure of the pressure protection device 1 on the pipeline. The sealing pressure may refer to the pressure value required for successful sealing of pipeline leakage holes.

In some embodiments, the control mechanism 2 may include a transverse shaft rod 201. The transverse shaft rod 201 may refer to a member for controlling the pressure exerted by the pressure plate 102 on the pipeline.

In some embodiments, the external fixing seat 101 is provided with at least two opposite sliding holes, and the pressure piston 202 matched with the sliding holes (that is, one-to-one matching) is provided in the sliding holes. The sliding hole may be a hole groove for sliding. The pressure piston 202 may refer to a piston for applying pressure to other components.

In some embodiments, a rod cavity protruding from the sliding hole is formed between one end of the pressure piston 202 and the sliding hole and is movably connected with one end of the transverse shaft rod 201. The other end of the pressure piston 202 is a rodless cavity. The external fixing seat 101 is provided with a through hole 203 connected with the rodless cavity, and the other end of the transverse shaft rod 201 is movably connected with the pressure plate 102. The through hole 203 may refer to the hole connected with the rodless cavity, and the aperture size of the through hole may be determined based on the actual needs.

In some embodiments, the "movable connection" may include, but is not limited to, articulation. For example, one end of the pressure piston 202 is hinged with one end of the transverse shaft rod 201 and/or the other end of the transverse shaft rod 201 is hinged with the pressure plate 102 through hinges or pivots. By means of articulation, the transverse shaft rod 201 may be rotated relative to the pressure piston 202 and/or the pressure plate 102 to control the pressure plate 102 to approach or move away from the pipeline.

In some embodiments, the external fixing seat 101 is also provided with a limited slideway 1011.

The limited slideway 1011 may refer to the slideway used for limiting the transverse shaft rod 201 and the pressure piston 202. In some embodiments, the limited slideway 1011 is arranged along the displacement direction of the transverse shaft rod 201, and the end of the pressure piston 202 protruding out of the sliding hole is matched with the limited slideway 1011, and is slidably arranged in the limited slideway 1011.

In some embodiments, when the pipeline needs to be blocked, medium (such as gas) may be introduced into the rodless cavity connected with the through hole 203 through the through hole 203, so that the pressure piston 202 may push the transverse shaft rod 201 to move in the limited slideway 1011, that is, the two transverse shaft rods 201 connected to the pressure plate 102 may move relative to each other, so that the included angle between the two transverse shaft rods 201 becomes smaller gradually, therefore, the pressure plate 102 connected with the two transverse shaft rods 201 gradually moves towards the direction close to the pipeline until the encircling sealing rubber cover 4 is pressed on the pipeline, so as to realize the sealing of the pipeline.

As shown in FIG. 1, the anti-retraction mechanism 3 may be connected with the pressure protection device 1 and the control mechanism 2 to limit the pressure protection device 1 and/or the control mechanism 2.

In some embodiments, an anti-retraction mechanism 3 is arranged between the transverse shaft rod 201 and the external fixing seat 101 to stop the pressure piston 202 so as to prevent the pressure piston 202 from failing.

Figure 2:
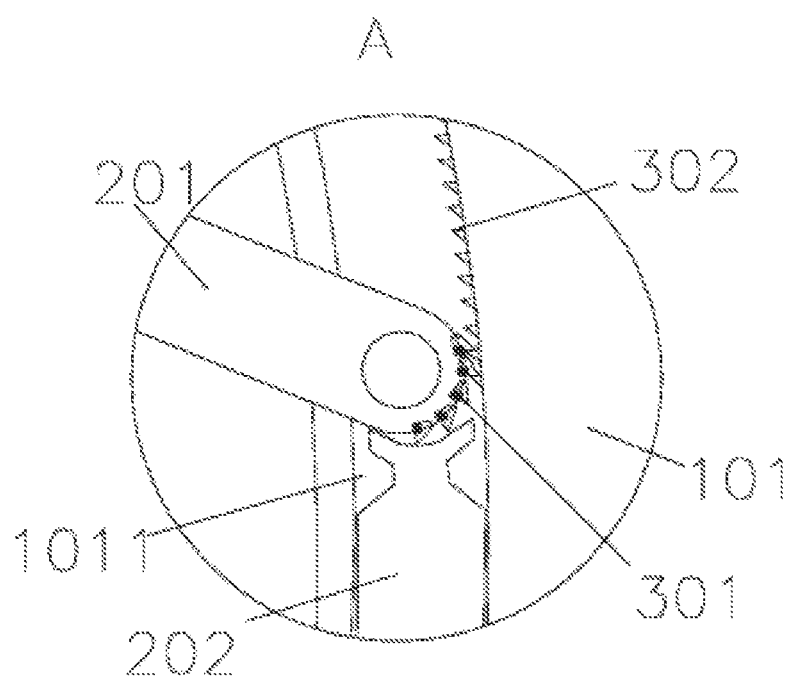
FIG. 2 is a partially enlarged view of A in FIG. 1 according to some embodiments of the present disclosure.
Figure 3:
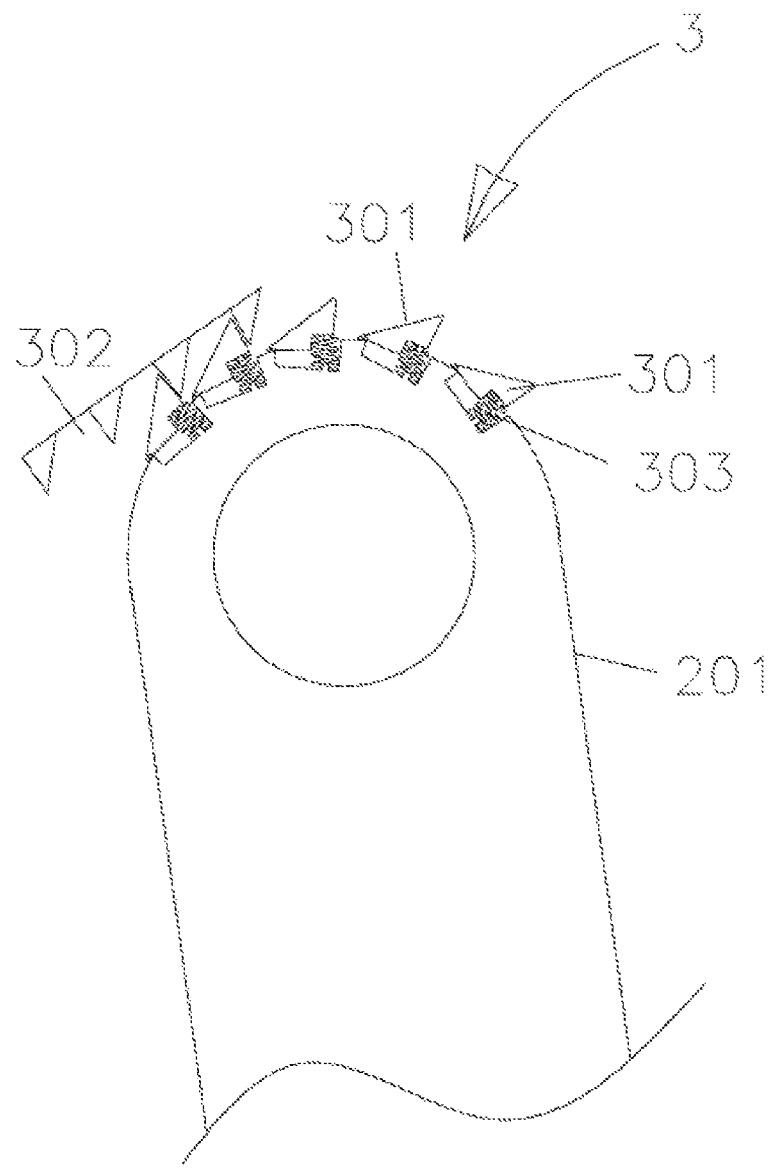
FIG. 3 is a structural schematic diagram of a control mechanism and an anti-retraction mechanism of an adaptive sealing device for pipeline porous leakage according to some embodiments of the present disclosure.

FIG. 2 is a partially enlarged view of A in FIG. 1 according to some embodiments of the present disclosure. FIG. 3 is a structural schematic diagram of a control mechanism and an anti-retraction mechanism of an adaptive sealing device for pipeline porous leakage according to some embodiments of the present disclosure.

In some embodiments, the anti-retraction mechanism 3 may adopt various structural designs. For example, the anti-retraction mechanism 3 may adopt a structure such as clamping plate and groove fitting, rack and pinion fitting, etc. As shown in FIG. 2, the anti-retraction mechanism 3 may also include a one-way pawl 301.

The one-way pawl 301 may be one of the key components in the anti-retraction mechanism 3. In some embodiments, the one-way pawl 301 is arranged on the transverse shaft rod 201, specifically, a plurality of one-way pawls 301 may be arranged around the connection point between the transverse shaft rod 201 and the pressure piston 202. The external fixing seat 101 is provided with a one-way tooth groove 302 along the displacement direction of the transverse shaft rod 201. The displacement direction of the transverse shaft rod 201 may refer to the moving direction of one end of the transverse shaft rod 201 in the limited slideway 1011.

The one-way tooth groove 302 may be another key component in the anti-retraction mechanism 3. In some embodiments, the one-way tooth groove 302 may be matched with the one-way pawl 301 (i.e., one-to-one matching). By clamping the one-way pawl 301 in the one-way tooth groove 302, the support of the transverse shaft rod 201 to the pressure plate 102 is more stable and reliable. It should be noted that the specific numbers of the one-way pawl 301 and the one-way tooth groove 302 may be determined based on simulation, past experience, or the like.

As shown in FIG. 3, an elastic member 303 is arranged between the one-way pawl 301 and the transverse shaft rod 201. The elastic member 303 may be a component having elasticity, including but not limited to a spring, etc. By setting an elastic element 303 between the one-way pawl 301 and the transverse shaft rod 201, the contact between the one-way pawl 301 and the one-way tooth groove 302 may be adaptively adjusted to better ensure the stability and reliability of the one-way pawl 301.

The encircling sealing rubber cover 4 may refer to the part that directly contacts with the pipeline and is used for sealing the pipeline. As shown in FIG. 1, the encircling sealing rubber cover 4 may be arranged between the pressure plate 102 and the pipeline, and the pressure plate 102 is arranged between the external fixing device and the encircling sealing rubber cover 4.

In some embodiments, the encircling sealing rubber cover 4 is provided with a strain gauge pressure sensor 6 and a numerical control pressure device (not shown in the figure).

The strain gauge pressure sensor 6 may be a pressure sensor that uses an elastic sensitive element and a strain gauge to convert the measured pressure into a corresponding change in resistance value.

The numerical control pressure device may refer to a device used to inflate and pressure the through hole 203, such as a charging pump and other devices.

In some embodiments, the strain gauge pressure sensor 6 and the numerical control pressure device is signal connected, and the output end of the numerical control pressure device is connected with the through hole 203 for inflating and pressurizing the through hole 203.

In some embodiments, "signal connection" may mean that signals (such as pressure detection values, etc.) may be transmitted between the strain gauge pressure sensor 6 and the numerical control pressure device. The signal transmission mode may be wired transmission (for example, using data cable for signal transmission) or wireless transmission (for example, using Bluetooth, Wi-Fi, or other method for signal transmission).

In some embodiments, the numerical control pressure device may pressurize the inlet air of the through hole 203 based on the pressure detection value obtained by the strain gauge pressure sensor 6. For example, in response to that the pressure detection value of the strain gauge pressure sensor 6 exceeds the device sealing level, the numerical control pressure device may pressurize the inlet air of the through hole 203.

The pressure detection value may refer to the pressure value in the pipeline at the leakage hole of the pipeline detected by the strain gauge pressure sensor 6. For example, the pressure detection value may be 5 Mpa, 10 Mpa, etc.

The device sealing level may refer to the sealing pressure level used for sealing the pipeline. For example, the device sealing level may be level one, level two, level three, etc.

In some embodiments, different device sealing levels correspond to different sealing pressure. For example, when the device sealing level is level I, the corresponding sealing pressure may be within a range of (0 Mpa, 5 Mpa], and when the device sealing level is level II, the corresponding sealing pressure may be within a range of (5 Mpa, 10 Mpa], etc.

The device sealing level may be determined in many ways. In some embodiments, the sealing level of the device may be preset in advance based on historical experience. In some embodiments, the device sealing level may be determined based on the tooth amount of the one-way pawl 301. For example, when 1<tooth amount of one-way pawl 301≤5, the corresponding device sealing level is level I; when 5<tooth amount of one-way pawl 301≤10, the corresponding device sealing level is level II. The tooth amount may refer to the number of tooth of the one-way tooth groove 302 that the one-way pawl 301 is coupled to. It should be noted that the corresponding relationship between the device sealing level and the tooth amount of the one-way pawl 301 may be determined based on actual conditions.

The inflation pressure when the numerical control pressure device pressurizes the inlet air of the through hole 203 may be determined in a variety of ways. In some embodiments, the inflation pressure may be determined based on the difference between the pressure detection value and the sealing pressure corresponding to the current device sealing level. For example, if the pressure detection value is 7 Mpa, the sealing pressure corresponding to the current device sealing level is within a range of (0 Mpa, 5 Mpa], and the difference between the pressure detection value and the sealing pressure corresponding to the current device sealing level is within a range of (2 Mpa, 7 Mpa], then any pressure value in the range of (2 Mpa, 7 Mpa] may be determined as the inflation pressure (i.e., candidate inflation pressure).

In some embodiments, the distribution vector of the sealing effect of at least one candidate inflation pressure may be determined by preset method based on the pressure detection value and in combination with the mechanical property of materials of the pipeline and the feature of the leakage hole. Then, the optimal inflation pressure of the numerical control pressure device may be determined based on the distribution vector of the sealing effect. For details about how to determine the optimal inflation pressure of the numerical control pressure device based on the pressure detection value, please refer to FIG. 6 and its related descriptions.

In some embodiments, the encircling sealing rubber cover 4 may include a plurality of sealing rubber blocks 401.

The sealing rubber block 401 may be a component for forming the encircling sealing rubber cover 4. In some embodiments, a plurality of sealing rubber blocks 401 are connected head to tail to form an encircling sealing rubber cover 4. The head-to-tail connection may be a detachable connection, such as a threaded fitting, a buckle, etc.

Figure 4:
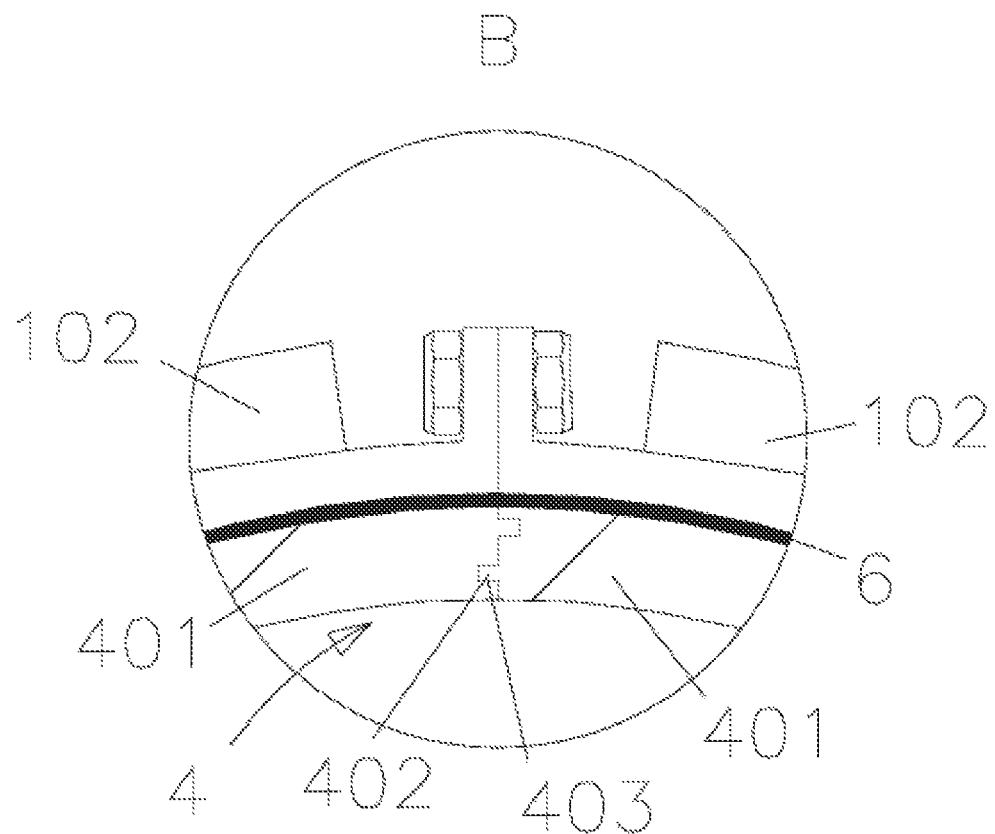
FIG. 4 is a partially enlarged view of B in FIG. 1 according to some embodiments of the present disclosure.

FIG. 4 is a partially enlarged view of B in FIG. 1 according to some embodiments of the present disclosure.

As shown in FIG. 4, two adjacent sealing rubber blocks 401 are engaged with each other through a clamping groove 403 and a clamping block 402. In some embodiments, one of the two adjacent sealing rubber blocks 401 may be provided with at least one clamping groove 403, and the other sealing rubber block 401 may be provided with at least one clamping block 402. The clamping groove 403 is matched with the clamping block 402 (i.e., one-to-one corresponding matching), and the clamping block 402 is clamped in the clamping groove 403 to achieve the clamping connection, so as to ensure the tightness of the connection between the two adjacent sealing rubber blocks 401.

Figure 5:
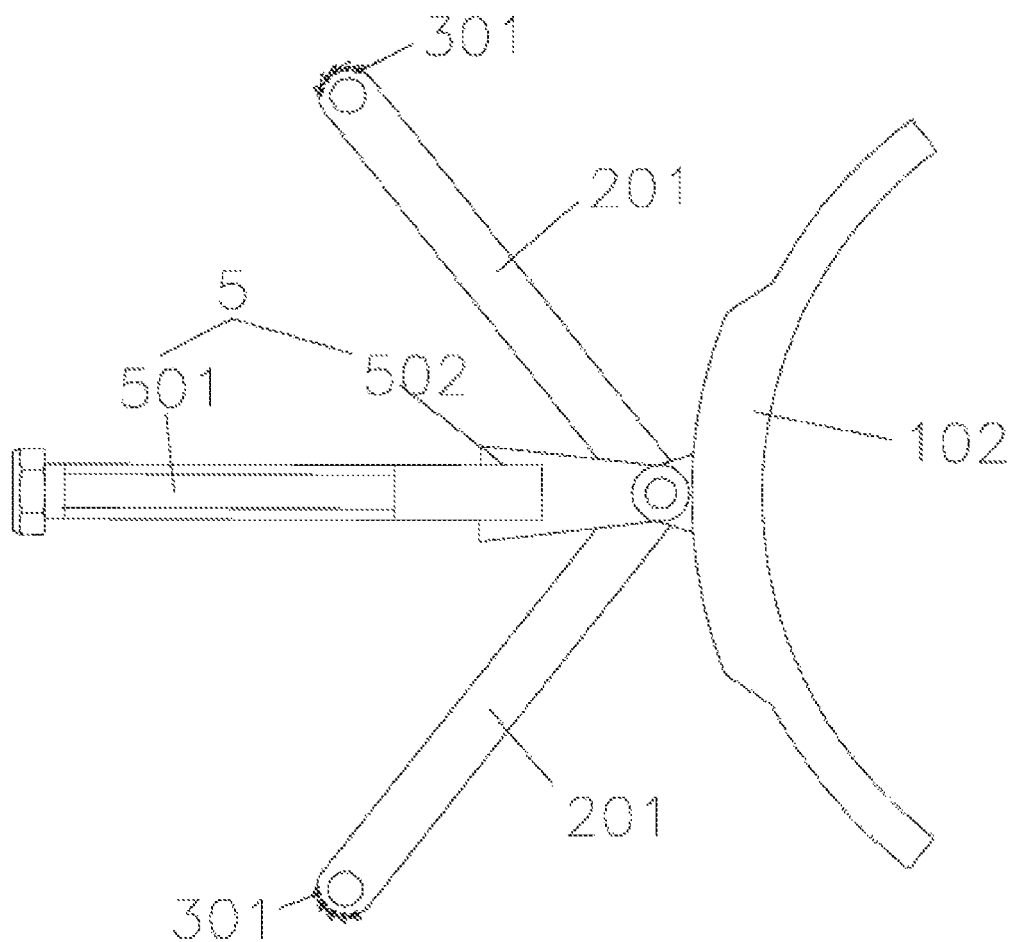
FIG. 5 is a structural schematic diagram of a pressure plate, a control mechanism, and a pressure reloading mechanism of an adaptive sealing device for pipeline porous leakage according to some embodiments of the present disclosure.

FIG. 5 is a structural schematic diagram of a pressure plate, a control mechanism, and a pressure preloading mechanism of an adaptive sealing device for pipeline porous leakage according to some embodiments of the present disclosure.

As shown in FIG. 5, the sealing device for pipeline porous leakage may also include a pressure preloading mechanism 5.

The pressure preloading mechanism 5 may refer to a mechanism for pressurizing and preloading the pressure plate 102. In some embodiments, the pressure preloading mechanism 5 may be arranged between the external fixing seat 101 and the pressure plate 102, which is between two relatively moving transverse shaft rod 201, so as to provide double guarantees for the pressure plate 102 to stably and reliably apply pressure to the pipeline.

In some embodiments, the pressure preloading mechanism 5 may include a pressure rod 501.

The pressure rod 501 may refer to a rod connected to the pressure plate 102 for pressure preloading the pressure plate 102. In some embodiments, one end of the pressure rod 501 is connected with the external fixing seat 101, and the other end of the pressure rod 501 is abutted on the pressure plate 102. In some embodiments, one end of the pressure rod 501 may be connected with the external fixing seat 101 by using a threaded fitting. By rotating the pressure rod 501, the supporting force of the pressure rod 501 on the pressure plate 102 may be adjusted. In some embodiments, one end of the pressure rod 501 may be connected with the external fixing seat 101 in other forms.

In some embodiments, a limited hole 502 is arranged on the pressure plate 102.

The limited hole 502 may refer to a hole used to limit the pressure rod 501. In some embodiments, the limited hole 502 matches the pressure rod 501 (i.e., one-to-one matching), and the other end of the pressure rod 501 abuts against the limiting hole 502. By opening a limited hole 502 corresponding to the pressure rod 501 on the pressure plate 102, the support position of the pressure rod 501 may be limited, thus ensuring the stability and reliability of the pressure rod 501 when preloading the pressure plate 102.

As shown in FIG. 1, when using the sealing device for pipeline porous leakage provided by some embodiments of the present disclosure, first, three external fixing seats 101 may be connected and fixed with each other through screws, and the pipeline is located between the three external fixing seats 101. At the same time, three sealing rubber blocks 401 are fixedly installed at the leakage hole of the pipeline, and the three sealing rubber blocks 401 may be connected and fixed head to tail through screws, and the sealing rubber blocks is wrapped on the peripheral surface of the pipeline to form an encircling sealing rubber cover 4. The encircling sealing rubber cover 4 is provided with a strain gauge pressure sensor 6 and a numerical control pressure device. The pressure in the pipeline at the leakage hole may be detected based on the strain gauge pressure sensor 6. When the pressure detection value exceeds the device sealing level, the output end of the numerical control pressure device may be used to introduce media into the through hole 203 to control the movement of the pressure piston 202 in the sliding hole, the two transverse shaft rods 201 connected with the pressure plate 102 are pushed to perform relative movement. At this time, the one-way pawl 301 on the transverse shaft rod 201 moves in the one-way tooth groove 302. As the included angle between the two transverse shaft rods 201 gradually decreases, the pressure plate 102 abutted on the encircling sealing rubber cover 4 may gradually move towards the direction close to the pipeline. At the same time, the encircling sealing rubber cover 4 may gradually be compressed on the pipeline until the sealing requirements are met. Then, the pressure rod 501 may be rotated to abutted in the limited hole 502 to complete the operation. The sealing requirements may refer to the requirements for successful sealing of pipeline leakage holes, for example, sealing pressure is not less than the pressure detection value.

In some embodiments of the present disclosure, the sealing device for pipeline porous leakage adopts a strain gauge pressure sensor and a numerical control pressure device, which may block the leakage hole of the pipeline in a targeted manner, and may adaptively adjust the sealing pressure to ensure sealing effect. The structure of the sealing device is simple, and the sealing effect may be further ensured by adopting the anti-retraction mechanism, the pressure preloading mechanism, and the pressure piston. The internal sealing device is easy to replace and operate, which may save manpower and material resources. In addition, the sealing device for pipeline porous leakage may also seal pipelines with different diameters, pressures, and transportation media by replacing different external fixing devices and materials of the encircling sealing rubber cover.

FIG. 6 is an exemplary flowchart illustrating a process of determining inflation pressure according to some embodiments of the present disclosure. As shown in FIG. 6, the process 600 includes the following steps. In some embodiments, process 600 may be performed by a numerical control pressure device.

Step 610, determining the distribution vector of the sealing effect of at least one candidate inflation pressure by a preset method based on the pressure detection value and in combination with the mechanical property of material of the pipeline and the feature of the leakage hole.

The mechanical property of material of the pipeline may refer to mechanical property related to the material of the pipeline. For example, the mechanical property of material of the pipeline may include tensile strength, yield strength, yield limit, etc.

In some embodiments, the mechanical property of the material of the pipeline may be obtained in multiple ways. For example, the mechanical property of the material of the pipeline may be directly input from the client. For another example, the mechanical property of the material of the pipeline may be obtained based on a third party (e.g., a pipeline manufacturer).

The feature of leakage hole may refer to a feature related to the shape of a leakage hole of a pipeline, for example, the shape of the leakage hole, whether there are sharp corner in the leakage hole, etc.

In some embodiments, the feature of leakage hole may be determined based on a variety of methods. For example, the image of the pipeline at the leakage hole may be obtained based on a data acquisition device (such as a camera, etc.), and the feature of leakage hole may be determined through image recognition and other technologies. For another example, the feature of leakage hole may be determined manually, directly input from the user terminal, etc.

The candidate inflation pressure may refer to any inflation pressure that may meet the sealing requirements of pipeline leakage holes. For example, if the minimum inflation pressure that meets the sealing requirement of pipeline leakage hole is 2 Mpa, and the maximum inflation pressure that meets the sealing requirement of pipeline leakage hole is 7 Mpa, then it may be considered that any inflation pressure in a range of (2 Mpa, 7 Mpa] is a candidate inflation pressure.

The candidate inflation pressure may be determined based on a variety of methods. In some embodiments, at least one candidate inflation pressure may be determined based on the pressure detection value and in combination with the mechanical property of material of the pipeline and the feature of the leakage hole. For example, the minimum inflation pressure (e.g., 2 Mpa) that meets the sealing requirement of pipeline leakage hole may be determined based on the pressure detection value, and the maximum inflation pressure (e.g., 7 Mpa) that meets the sealing requirement of pipeline leakage hole may be determined based on the mechanical property of material and the feature of leakage hole, the value between the minimum inflation pressure and the maximum inflation pressure (e.g., (2 Mpa, 7 Mpa]) that meet the sealing requirement of the pipeline leakage hole is determined as the candidate inflation pressure.

In some embodiments, at least one candidate inflation pressure may also be retrieved based on a vector database. For specific content about how to retrieve at least one candidate inflation pressure based on the vector database, please refer to FIG. 8 and related descriptions.

The distribution vector of the sealing effect may refer to the probability distribution of sealing effect of the leakage hole when inflation and pressurization are performed based on a candidate inflation pressure. For example, the distribution vector of sealing effect corresponding to the candidate inflation pressure may be expressed as (a, b, c), (a, b, c) means that the probability of leakage still existing after sealing based on the candidate inflation pressure is a, the probability of successful sealing is b, and the probability of leakage hole expansion or pipeline fracture after sealing is c.

The preset method may refer to a determination method for the distribution vector of the sealing effect of at least one candidate inflation pressure. For example, the preset method includes but is not limited to retrieval and acquisition based on a vector database, determination based on an algorithm model, etc.

In some embodiments, determining the distribution vector of the sealing effect of at least one candidate inflation pressure by a preset method may include: determining the distribution vector of the sealing effect of at least one candidate inflation pressure based on the processing of pressure detection value, feature of leakage hole, mechanical property of material of pipeline, and at least one candidate inflation pressure based on the sealing judgment model.

The sealing judging model may refer to a model for judging the sealing effect corresponding to at least one candidate inflation pressure. In some embodiments, the sealing judgment model may be a machine learning model. For example, the sealing judgment model may be any one or combination of a deep neural network (DNN) model, a recurrent neural network (RNN) model, a long short-term memory neural network (LSTM) model, or other custom model structures.

In some embodiments, the sealing judgment model may process the pressure detection value, feature of leakage hole, mechanical property of material of the pipeline, and at least one candidate inflation pressure to determine the distribution vector of the sealing effect of the at least one candidate inflation pressure. The input of the sealing judgment model may include the pressure detection value, feature of leakage hole, mechanical property of material of the pipeline, at least one candidate inflation pressure, and output of the sealing judgment model may include the distribution vector of the sealing effect of at least one candidate inflation pressure.

Figure 7:
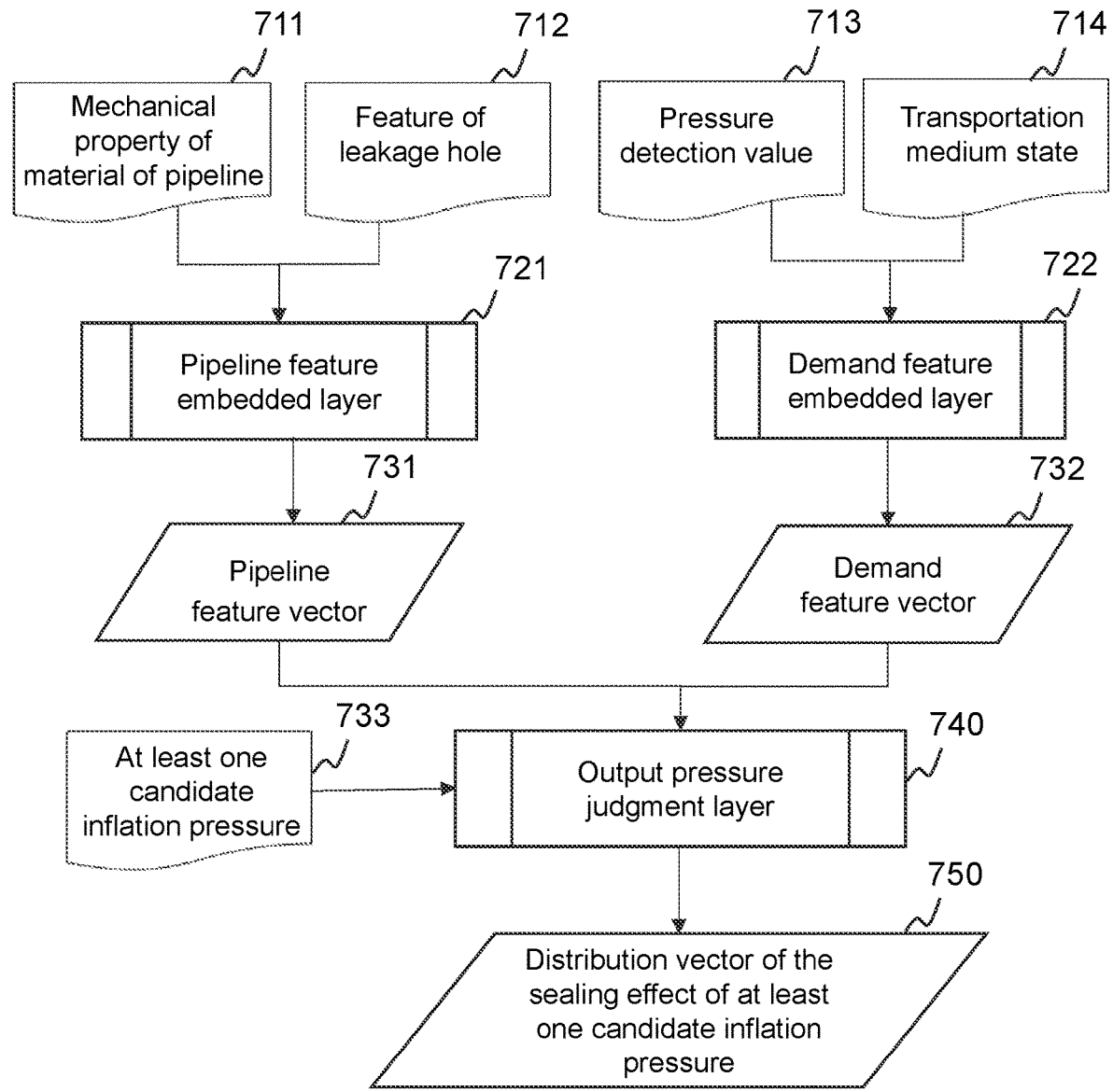
FIG. 7 is an exemplary schematic diagram of a sealing judgment model according to some embodiments of the present disclosure.

For more details about how to determine the distribution vector of the sealing effect of at least one candidate inflation pressure based on the sealing judgment model, please refer to FIG. 7 and related descriptions.

Step 620, determining, based on the distribution vector of the sealing effect, the optimal inflation pressure of the numerical control pressure device.

The optimal inflation pressure may refer to a preferred value among candidate inflation pressures.

Based on the distribution vector of the sealing effect, there are many ways to determine the optimal inflation pressure of the numerical control pressure device. In some embodiments, the optimal inflation pressure may be determined based on a corresponding element in the distribution vector of the sealing effect. For example, the element of probability of successful sealing in the distribution vector of the sealing effect may be directly compared, and the candidate inflation pressure corresponding to the distribution vector of the sealing effect with the highest probability of successful sealing is determined as the optimal inflation pressure. For another example, the candidate inflation pressure corresponding to the distribution vector of the sealing effect whose probability of successful sealing satisfies a preset probability threshold in the distribution vector of the sealing effect may be determined as the optimal inflation pressure. The preset probability threshold may be a preset probability value of successful sealing, which may be determined based on actual requirements.

Figure 8:
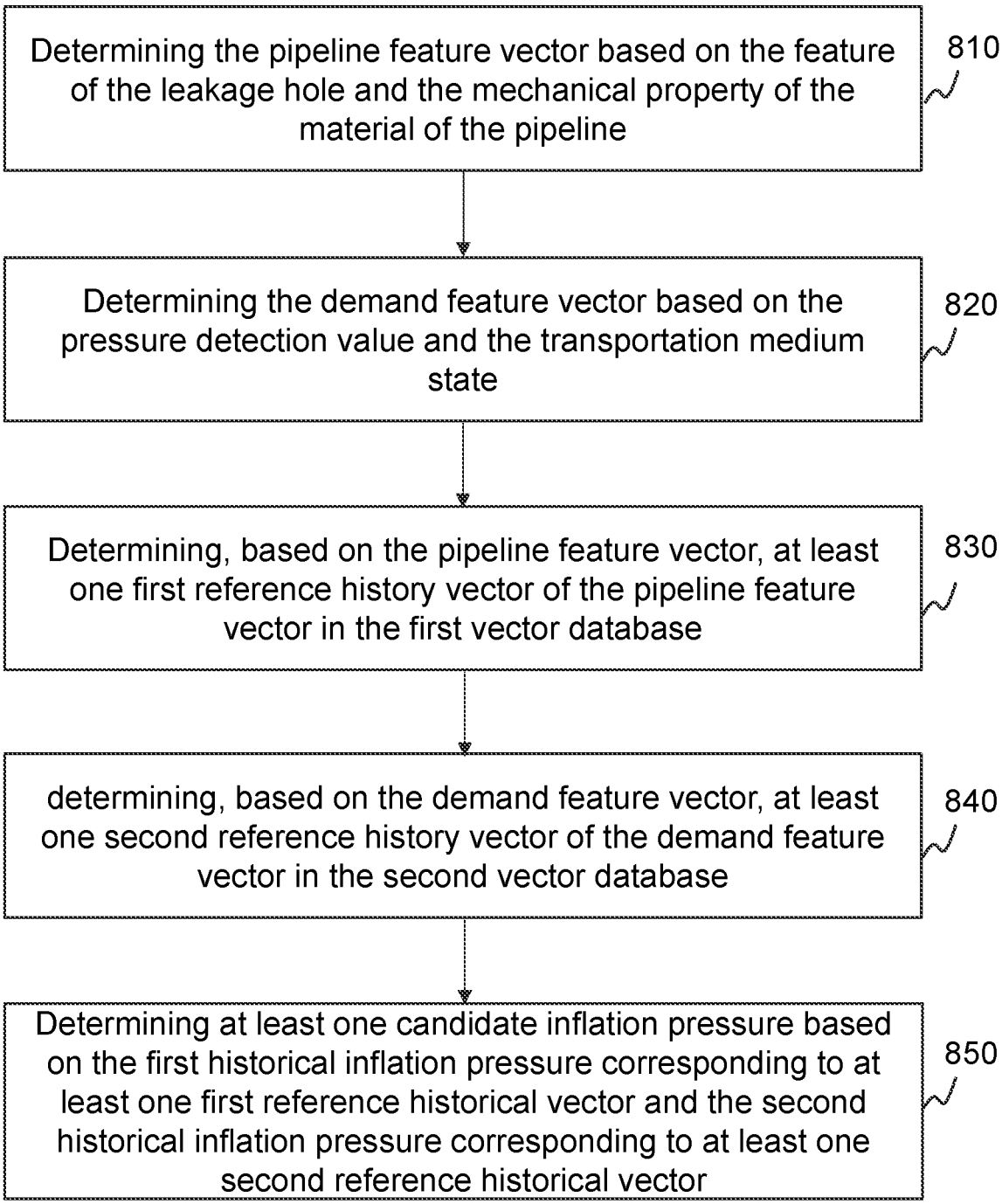
FIG. 8 is an exemplary flowchart illustrating a process of determining candidate inflation pressure according to some embodiments of the present disclosure.

For more information about how to determine the optimal inflation pressure of the numerical control pressure device based on the distribution vector of the sealing effect, please refer to FIG. 8 and its related descriptions.

In some embodiments of the present disclosure, the distribution vector of the sealing effect of at least one candidate inflation pressure is determined by a preset method based on the pressure detection value and in combination with the mechanical property of material of the pipeline and the feature of leakage hole, and then the optimal inflation pressure of the numerical control pressure device is determined based on the distribution vector of the sealing effect. The inflation pressure may be determined more accurately by comprehensively considering a variety of sealing influence factors to better seal the leakage hole of pipeline, so as to ensure the sealing effect.

It should be noted that the above description about the process 600 is only for example and description, and does not limit the scope of application of the present disclosure. For those skilled in the art, various modifications and changes may be made to the process 600 under the guidance of the present disclosure. However, these amendments and changes are still within the scope of the present disclosure.

FIG. 7 is an exemplary schematic diagram of a sealing judgment model according to some embodiments of the present disclosure.

As shown in FIG. 7, the sealing judgment model may include pipeline feature embedded layer 721, demand feature embedded layer 722, and output pressure judgment layer 740.

In some embodiments, the pipeline feature vector 731 may be determined through the pipeline feature embedded layer 721 based on the mechanical property of material of pipeline 711 and feature of leakage hole 712. The input of the pipeline feature embedded layer 721 may include the mechanical property of material of the pipeline 711 and the feature of leakage hole 712, and output of the pipeline feature embedded layer 721 may include the pipeline feature vector 731. In some embodiments, pipeline feature embedded layer 721 may be a machine learning model.

The pipeline feature vector 731 may refer to a vector related to the pipeline feature. For example, the pipeline feature vector 731 may be expressed as (70 Mpa, 0), (70 Mpa, 0) means that the tensile strength of the pipeline is 70 Mpa, and there is no sharp corner in the leakage hole.

In some embodiments, the demand feature vector 732 may be determined through the demand feature embedded layer 722 based on the pressure detection value 713 and the transportation medium state 714. The input of demand feature embedded layer 722 may include a pressure detection value 713 and a transportation medium state 714, and output of demand feature embedded layer 722 may include a demand feature vector 732. In some embodiments, the demand feature embedded layer 722 may be a machine learning model.

The transportation medium status 714 may refer to the existence status of the medium transported by the pipeline. For example, the transportation medium state may include gaseous state, liquid state, etc.

The demand feature vector 732 may refer to a vector related to the sealing requirement at the leakage hole of pipeline. For example, the demand feature vector may be expressed as (10 Mpa, 1), (10 Mpa, 1) means that the pressure detection value at the leakage hole of the pipeline is 10 Mpa, and the transportation medium state in the pipeline is gaseous.

In some embodiments, the distribution vector of the sealing effect 750 of at least one candidate inflation pressure may be determined through the output pressure judgment layer 740 based on the pipeline feature vector 731, the demand feature vector 732, and at least one candidate inflation pressure 733. The input of output pressure judgment layer 740 may include pipeline feature vector 731, demand feature vector 732, and at least one candidate inflation pressure 733, and output of output pressure judgment layer 740 may include distribution vector of the sealing effect 750 of at least one candidate inflation pressure. In some embodiments, the output pressure determination layer 740 may be a machine learning model.

In some embodiments, the sealing judgment model may be obtained by jointly training the pipeline feature embedded layer 721, the demand feature embedded layer 722, and the output pressure judgment layer 740. Exemplarily, the pipeline feature embedded layer 721, the demand feature embedded layer 722, and the output pressure judgment layer 740 may be trained based on a large number of training samples with labels. The training sample may be the mechanical property of material of the sample pipeline, the feature of the sample leakage hole, the sample pressure detection value, the sample transportation medium state, and at least one sample inflation pressure. The label may be actual distribution vector of the sealing effect the corresponding to the at least one sample inflation pressure, which is expressed as (x, y, z). If leakage still exists after sealing based on at least one sample inflation pressure, x is taken as 1 and y is taken as 0; otherwise, x is taken as 0 and y is taken as 1. z may be determined according to whether there is leakage hole expansion or pipeline fracture after sealing based on at least one sample inflation pressure. If there is leakage hole expansion or pipeline fracture, z is taken as 1; if there is no leakage hole expansion or pipeline fracture, z is taken as 0. Training samples and their labels may be obtained based on historical data. The historical data may refer to the data collected during the use of the sealing device for pipeline porous leakage in the past.

In some embodiments, the mechanical property of material of the sample pipeline and the feature of sample leakage hole are input into the pipeline feature embedded layer 721 to obtain the pipeline feature vector 731 output by the pipeline feature embedded layer. The sample pressure detection value and the sample transportation medium state are input into the demand feature embedded layer 722 to obtain the demand feature vector 732 output by the demand feature embedded layer 722. The pipeline feature vector 731 and demand feature vector 732 are taken as training sample data, and the training sample data and at least one sample inflation pressure are input into the output pressure judgment layer 740 to obtain the distribution vector of the sealing effect of at least one sample inflation pressure output by output pressure judgment layer 740. The loss function is constructed based on the actual distribution vector of the sealing effect corresponding to the at least one sample inflation pressure and the distribution vector of the sealing effect of the at least one sample inflation pressure output from the output pressure judgment layer 740, and the parameters of pipeline feature embedded layer 721, the parameters of demand feature embedded layer 722, and the parameters of output pressure judgment layer 740 are updated simultaneously. Through parameter updating, the trained pipeline feature embedded layer 721, the trained demand feature embedded layer 722, and the trained output pressure judgment layer 740 are obtained.

In some embodiments of the present disclosure, the distribution vector of the sealing effect of at least one candidate inflation pressure is determined by using the trained sealing judgment model, which may improve the prediction accuracy of the distribution vector of the sealing effect, and determine the optimal inflation pressure more accurately, thus laying a foundation for achieving high-quality sealing. In addition, the sealing judgment model is trained using the jointly training method, which may also improve the prediction efficiency of the sealing judgment model, so as to quickly determine the optimal inflation pressure, and perform the corresponding sealing operation on leakage hole of the pipeline, thus reducing the economic losses or environmental hazards caused by the leakage of transportation medium.

FIG. 8 is an exemplary flowchart illustrating a process of determining candidate inflation pressure according to some embodiments of the present disclosure. As shown in FIG. 8, the process 800 includes the following steps. In some embodiments, process 800 may be performed by a numerical control pressure device.

Step 810, determining the pipeline feature vector based on the feature of the leakage hole and the mechanical property of the material of the pipeline.

The pipeline feature vector may be determined in various ways based on the feature of leakage hole and the mechanical property of the material of the pipeline.

In some embodiments, the parameters of the feature of leakage hole (such as whether there is a sharp corner) and the mechanical property of material of the pipeline (such as yield strength, tensile strength, etc.) may be combined in the first preset method to determine the pipeline feature vector.

The first preset method may refer to a combination method of feature parameters corresponding to the feature of the leakage hole and the mechanical property of material of the pipeline respectively, which may be determined based on actual condition.

In some embodiments, the first preset method may include an arrangement sequence of feature parameters corresponding to the feature of the leakage hole and the mechanical property of the material of the pipeline. For example, the feature parameter corresponding to the feature of leakage hole is $x_1$, and the feature parameters corresponding to the mechanical property of material of the pipeline are $c_1$ and $c_2$, then the arrangement sequence of the feature parameters of the two may be $x_1$, $c_1$ and $c_2$ (i.e., at this time, the corresponding pipeline feature vector is ($x_1$, $c_1$, $c_2$)), or $c_1$, $c_2$, $x_1$ (i.e., at this time, the corresponding pipeline feature vector is ($c_1$, $c_2$, $x_1$)).

In some embodiments, the pipeline feature vector may also be obtained based on the pipeline feature embedded layer of the sealing judgment model. For example, the feature of leakage hole and the mechanical property of material of the pipeline may be processed based on the pipeline feature embedded layer to determine the pipeline feature vector. For more information about how the pipeline feature vector is obtained based on the pipeline feature embedded layer of the sealing judgment model, please refer to FIG. 7 and its related description.

Step 820, determining the demand feature vector based on the pressure detection value and the transportation medium state.

The demand feature vector may be determined in various ways based on the pressure detection value and the transportation medium state. In some embodiments, the feature parameters of the pressure detection value and the transportation medium state may be combined in a second preset method directly according to the pressure detection value and the transportation medium state (such as gas, liquid, etc.) to determine the demand feature vector.

The second preset method may refer to a combination mode of feature parameters corresponding to the preset pressure detection value and the preset transportation medium state, which may be determined based on actual condition.

In some embodiments, the second preset method may include an arrangement sequence of feature parameters corresponding to the pressure detection value and the transportation medium state. For example, if the feature parameter corresponding to the pressure detection value is y, and the feature parameter corresponding to the transportation medium state is j, then the arrangement sequence of the feature parameters of the pressure detection value and the transportation medium state may be y, j (i.e., the corresponding demand feature vector at this time is (y, j)), or j, y (i.e., the corresponding demand feature vector is (j, y)).

In some embodiments, the demand feature vector may also be obtained based on the demand feature embedded layer of the sealing judgment model. For example, the pressure detection value and the transportation medium state may be processed based on the demand feature embedded layer to determine the demand feature vector. For more information about how the demand feature vector is obtained based on the demand feature embedded layer of the sealing judgment model, please refer to FIG. 7 and its related description.

Step 830, determining, based on the pipeline feature vector, at least one first reference history vector of the pipeline feature vector in the first vector database.

The first vector database may include multiple historical pipeline feature vectors. The historical pipeline feature vector may refer to a collection of all pipeline feature vectors in the past.

In some embodiments, the historical pipeline feature vector is constructed and updated in real time based on the pipeline feature embedded layer of the sealing judgment model to continuously expand the first vector database. For the construction method of the historical pipeline feature vector, please refer to the construction instructions of the pipeline feature vector.

In some embodiments, the first reference history vector corresponding to the pipeline feature vector may be determined by calculating the similarity between the historical pipeline feature vector and the pipeline feature vector, such as determining that the historical pipeline feature vector with the similarity greater than the similarity threshold or with the largest similarity is the first reference history vector.

In some embodiments, the similarity between the historical pipeline feature vector and the pipeline feature vector may be determined based on the vector distance between the historical pipeline feature vector and the pipeline feature vector, the smaller the vector distance is, the greater the similarity is. For example, the historical pipeline feature vector whose vector distance from the pipeline feature vector satisfies the preset relationship may be directly used as the first reference history vector. The preset relationship may be determined based on the actual condition. For example, the preset relationship may be that the vector distance is the smallest or the vector distance is smaller than a distance threshold. The vector distance may be a cosine distance, or the like.

Step 840, determining, based on the demand feature vector, at least one second reference history vector of the demand feature vector in the second vector database.

The second vector database may include a plurality of historical demand feature vectors. Historical demand feature vectors may refer to the collection of all demand feature vectors in the past.

In some embodiments, the historical demand feature vector may be constructed and updated in real time based on the demand feature embedded layer of the sealing judgment model to continuously expand the second vector database. The construction of historical demand feature vector is the same as that of demand feature vector.

In some embodiments, the second reference history vector corresponding to the demand feature vector may be determined by calculating the similarity between the historical demand feature vector and the demand feature vector. For example, it is determined that the historical demand feature vector with the similarity greater than the similarity threshold or with the largest similarity is the second reference historical vector.

In some embodiments, the similarity between the historical demand feature vector and the demand feature vector may be determined based on the vector distance between the historical demand feature vector and the demand feature vector, and the smaller the vector distance is, the greater the similarity is. Exemplarily, the historical demand feature vector whose vector distance from the demand feature vector satisfies a preset relationship may be directly used as the second reference historical vector. Likewise, the preset relationship may be determined based on actual condition. For example, the preset relationship may be that the vector distance is the smallest or the vector distance is smaller than a distance threshold. The vector distance may be a cosine distance, or the like.

Step 850, determining at least one candidate inflation pressure based on the first historical inflation pressure corresponding to at least one first reference historical vector and the second historical inflation pressure corresponding to at least one second reference historical vector.

The first historical inflation pressure may refer to the candidate inflation pressure corresponding to the first reference historical vector in the historical data. In some embodiments, at least one first reference history vector corresponds to at least one first history inflation pressure.

The second historical inflation pressure may refer to the candidate inflation pressure corresponding to the second reference historical vector in the historical data. In some embodiments, at least one second reference historical vector also corresponds to at least one second historical inflation pressure.

In some embodiments, at least one candidate inflation pressure may be determined in multiple ways based on at least one first historical inflation pressure and at least one second historical inflation pressure. For example, the maximum or average value of the first historical inflation pressure and the second historical inflation pressure may be determined as a candidate inflation pressure, at least one first historical inflation pressure and at least one second historical inflation pressure may be determined as at least one candidate inflation pressure.

In some embodiments, determining at least one candidate inflation pressure based on the first historical inflation pressure corresponding to at least one first reference history vector and the second historical inflation pressure corresponding to at least one second reference history vector may also include determining the candidate inflation pressure based on the weight sum of the first historical inflation pressure and the second historical inflation pressure.

Exemplarily, the first historical inflation pressure is 10 Mpa, and its weight value is 0.4. The second historical inflation pressure is 6 Mpa, and its weight value is 0.6. Then the candidate inflation pressure may be determined as 7.6 Mpa (i.e., 10×0.4+6×0.6=7.6).

In some embodiments, the weight values of the first history inflation pressure and the second history inflation pressure are related to the mechanical property of material of the pipeline. For example, when the mechanical property of material of the pipeline are poor (for example, the yield strength is less than the strength threshold), the weight value of the first historical inflation pressure may be increased accordingly to ensure that the pipeline is not be further damaged. When the mechanical property of material of the pipeline are good (for example, the yield strength is not less than the strength threshold), the weight value of the second historical inflation pressure may be increased accordingly to ensure the success rate of sealing. In some embodiments, the initial weight values of the first historical inflation pressure and the second historical inflation pressure may both be 0.5.

In some embodiments of the present disclosure, the candidate inflation pressure may be determined by weighting the sum of the first historical inflation pressure and the second historical inflation pressure based on the mechanical property of material of the pipeline, which ensures the applicability of the determined candidate inflation pressure to a certain extent, and is beneficial to improve the quality and efficiency of sealing.

In some embodiments, determining the optimal inflation pressure of the numerical control pressure device based on the distribution vector of the sealing effect may include: determining the distribution vector of the sealing effect corresponding to the candidate inflation pressure based on the candidate inflation pressure through the sealing judgment model, in response to that the distribution vector of the sealing effect corresponding to the candidate inflation pressure does not meet the preset condition, adjusting the candidate inflation pressure based on the preset adjustment rule until the distribution vector of the sealing effect corresponding to the candidate inflation pressure meets the preset condition, determining the optimal inflation pressure based on the candidate inflation pressure and distribution vector of the sealing effect corresponding to the candidate inflation pressure.

The preset condition may refer to a preset judgment condition. For example, the preset condition may be that the elements in the distribution vector of the sealing effect corresponding to the candidate inflation pressure and the corresponding threshold do not meet the preset requirement, etc. Exemplarily, the preset condition may be that the probability of successful sealing in the distribution vector of the sealing effect corresponding to the candidate inflation pressure is greater than the sealing success rate threshold. The sealing success rate threshold may refer to a preset sealing success rate, which may be determined based on actual requirement.

In some embodiments, when the distribution vector of the sealing effect corresponding to the candidate inflation pressure does not satisfy the preset condition, the candidate inflation pressure may be adjusted based on a preset adjustment rule. For example, the candidate inflation pressure may be adjusted in a manner of candidate inflation pressure× adjustment range. The preset adjustment rule may refer to a preset adjustment rule of candidate inflation pressure.

The adjustment range may be used to reflect the adjustment degree of the candidate inflation pressure. In some embodiments, the adjustment range may be preset. In some embodiments, the adjustment range may also be determined based on gradient ascent method and other methods.

In some embodiments, the adjustment range is related to the similarity between the pipeline feature vector and the historical pipeline feature vector and the similarity between the demand feature vector and the historical demand feature vector, the higher the similarities between the two are, the smaller the adjustment range is. The lower the similarities between the two are, the greater the adjustment range is. For the description of the similarity between the pipeline feature vector and the historical pipeline feature vector and the similarity between the demand feature vector and the historical demand feature vector, refer to the related descriptions in step 830 and step 840.

In some embodiments, the distribution vector of the sealing effect corresponding to the adjusted candidate inflation pressure may be determined through the sealing judgment model based on the adjusted candidate inflation pressure, and the above operations may be repeated until the distribution vector of the sealing effect corresponding to the adjusted candidate inflation pressure meets the preset condition.

In some embodiments of the present disclosure, the candidate inflation pressure is continuously adjusted until the distribution vector of the sealing effect corresponds to the adjusted candidate inflation pressure satisfies the preset condition based on the similarity between the pipeline feature vector and the historical pipeline feature vector and the similarity between the demand feature vector and the historical demand feature vector, which may lay the foundation for quickly and accurately determining the optimal inflation pressure to ensure the quality of sealing.

In some embodiments, when the distribution vector of the sealing effect corresponding to the adjusted candidate inflation pressure satisfies a preset condition, the adjusted candidate inflation pressure may be directly determined as the optimal inflation pressure. Exemplarily, when the candidate inflation pressure is 5 Mpa, the probability of successful sealing in the corresponding distribution vector of the sealing effect is less than the sealing success rate threshold (i.e., the preset condition is not met). After the candidate inflation pressure is adjusted based on preset adjustment rule (e.g., 5 Mpa×1.2), the adjusted candidate inflation pressure is 6 Mpa. At this time, the distribution vector of the sealing effect corresponding to the adjusted candidate inflation pressure meets the preset condition, then the adjusted candidate inflation pressure (such as 6 Mpa) may be determined as the optimal inflation pressure.

In some embodiments of the present disclosure, at least one candidate inflation pressure is obtained based on vector retrieval, the distribution vector of the sealing effect corresponding to at least one candidate inflation pressure is determined through the sealing judgment model, and the candidate inflation pressure that does not meet the preset condition is adjusted to determine the optimal inflation pressure, which may ensure the accuracy of the inflation pressure to a certain extent and be conducive to improving the success rate of sealing leakage hole of pipeline, thus ensuring the quality and efficiency of sealing.

It should be noted that the above description about the process 800 is only for illustration and description, and does not limit the scope of application of the present disclosure. For those skilled in the art, various modifications and changes may be made to the process 800 under the guidance of this description. However, such modifications and changes are still within the scope of the present disclosure.

The basic concept has been described above, obviously, for those skilled in the art, the above detailed disclosure is only an example, and does not constitute a limitation to the present disclosure. Although not expressly stated here, those skilled in the art may make various modifications, improvements and corrections to the present disclosure. Such modifications, improvements and corrections are suggested in the present disclosure, so such modifications, improvements and corrections still belong to the spirit and scope of the exemplary embodiments of the present disclosure.

The present disclosure uses specific words to describe the embodiments of the present disclosure. For example, "one embodiment", "an embodiment", and/or "some embodiments" mean a certain feature, structure or feature related to at least one embodiment of the present disclosure. Therefore, it should be emphasized and noted that references to "an embodiment" or "the embodiment" or "an alternative embodiment" two or more times in different places in the present disclosure do not necessarily refer to the same embodiment. In addition, certain features, structures or features in one or more embodiments of the present disclosure may be properly combined.

In addition, unless explicitly stated in the claims, the order of processing elements and sequences described in this specification, the use of numbers and letters, or the use of other names are not used to limit the sequence of processes and methods in the present disclosure. While the foregoing disclosure has discussed, by way of various examples, some embodiments of the disclosure that are presently believed to be useful, it should be understood that such detail is for illustrative purposes only and that the appended claims are not limited to the disclosed embodiments, but rather, the claims are intended to cover all modifications and equivalent combinations that fall within the spirit and scope of the embodiments of the present disclosure. For example, although the system components described above may be implemented by hardware devices, they may also be implemented by a software-only solution, such as installing the described system on an existing server or mobile device.

In the same way, it should be noted that in order to simplify the expression disclosed in the present disclosure and help the understanding of one or more embodiments of the invention, in the foregoing description of the embodiments of the present disclosure, sometimes multiple features are combined into one embodiment, drawings or descriptions thereof. This method of disclosure does not, however, imply that the subject matter of the present disclosure requires more features than are recited in the claims. Rather, claimed subject matter may lie in less than all features of a single foregoing disclosed embodiment.

In some embodiments, numbers describing the quantity of components and attributes are used, and it should be understood that such numbers used in the description of the embodiments, in some examples, use the modifiers "about", "approximately" or "substantially" to express grooming. Unless otherwise stated, "about", "approximately" or "substantially" indicates that the stated figure allows for a variation of ±20%. Accordingly, in some embodiments, the numerical parameters used in the present disclosure and claims are approximations that may vary depending upon the desired features of individual embodiments. In some embodiments, numerical parameters should take into account the specified significant digits and adopt the general digit reservation method. Although the numerical ranges and parameters used in some embodiments of the present disclosure to confirm the breadth of the range are approximations, in specific embodiments, such numerical values are set as precisely as practicable.

Each patent, patent application, patent application publication, and other material, such as article, book, specification, publication, document, etc., cited in the present disclosure is hereby incorporated by reference in its entirety. Application history documents that are inconsistent with or conflict with the content of the present disclosure are excluded, and documents (currently or later appended to this specification) that limit the broadest scope of the claims of the present disclosure are excluded. It should be noted that if there is any inconsistency or conflict between the description, definition, and/or use of terms in the attached materials of the present disclosure and the contents of this manual, the description, definition, and/or use of terms in the present disclosure shall prevail.

Finally, it should be understood that the embodiments described in the present disclosure are only used to illustrate the principles of the embodiments of the present disclosure. Other modifications are also possible within the scope of the present disclosure. Therefore, as an example rather than a limitation, the alternative configuration of the embodiments of the present disclosure may be regarded as consistent with the teachings of the present disclosure. Accordingly, the embodiments of the present disclosure are not limited to the embodiments explicitly introduced and described in the present disclosure.

What is claimed is:

1. An adaptive sealing device for pipeline porous leakage, wherein multiple pressure protection devices are connected head to tail and arranged around the pipeline, and are used for pressurizing and sealing a pipeline, each pressure protection device includes an external fixing seat and a pressure plate, and the external fixing seats of two adjacent pressure protection devices are connected with each other to form an external fixing device;

the external fixing seat and the pressure plate is provided with a control mechanism used to control the pressure plate to approach or move away from the pipeline, the control mechanism includes at least one transverse shaft rod, at least two opposite sliding holes are provided on the external fixing seat, a pressure piston that is matched with the sliding hole is provided in the sliding hole, a rod cavity protruding from the sliding hole is formed between one end of the pressure piston and the sliding hole, and is hinged with one end of the at least one transverse shaft rod, other end of the pressure piston is a rodless cavity, the external fixing seat is provided with a through hole connected with the rodless cavity, and other end of the at least one transverse shaft rod is hinged with the pressure plate;

an anti-retraction mechanism is used to stop the pressure piston and is arranged between the at least one transverse shaft rod and the external fixing seat;

an encircling sealing rubber cover is arranged between the pressure plate a and the pipeline and is used to seal the pipeline, the pressure plate is arranged between the external fixing device and the encircling sealing rubber cover, and a medium is introduced into the rodless cavity through the through hole to drive the pressure piston to move in the sliding hole to push two transverse shaft rods to move relatively to control the pressure plate to approach the pipeline and press the encircling sealing rubber cover on the pipeline to seal the pipeline;

the anti-retraction mechanism includes a one-way pawl, the one-way pawl is hinged on the at least one transverse shaft rod, the external fixing seat is provided with a one-way tooth groove along a displacement direction of the at least one transverse shaft rod, the one-way tooth groove is matched with the one-way pawl, and the one-way pawl is clamped in the one-way tooth groove;

a pressure preloading mechanism is arranged between the external fixing seat and the pressure plate and is used to pressurize and preload the pressure plate, and the pressure preloading mechanism is located between the two relatively moving transverse shaft rods; and the pressure preloading mechanism includes a pressure rod, one end of the pressure rod is in threaded connection with the external fixing seat, and other end of the pressure rod is abutted on the pressure plate.

2. The adaptive sealing device of claim 1, wherein a spring is arranged between the one-way pawl and the at least one transverse shaft rod.

3. The adaptive sealing device of claim 1, wherein the a pressure plate is provided with a limited hole, the limited hole is matched with the pressure rod, and the other end of the pressure rod is butted in the limited hole.

4. The adaptive sealing device of claim 1, wherein the encircling sealing rubber cover includes a plurality of sealing rubber blocks, and the plurality of sealing rubber blocks are connected head to tail to form the encircling sealing rubber cover.

5. The adaptive sealing device of claim 4, wherein one sealing rubber block of two adjacent sealing rubber blocks is provided with a clamping groove, the other sealing rubber block of two adjacent sealing rubber blocks is provided with a clamping block, the clamping groove is a matched with the clamping block, and the clamping block is clamped in the clamping groove.

6. The adaptive sealing device of claim 1, wherein the external fixing seat is provided with a limited slideway, the limited slideway is arranged along a displacement direction of the transverse shaft rod, and an end of the pressure piston protruding out of the sliding hole is matched with the limited slideway and is slidably arranged in the limited slideway.

7. The adaptive sealing device of claim 1, wherein the encircling sealing rubber cover is provided with a strain gauge pressure sensor and a numerical control pressure device, the strain gauge pressure sensor is signal connected with the numerical control pressure device, and an output end of the numerical control pressure device is connected with the through hole for inflating and pressurizing the through hole.

* * * * *